United States Patent
Tylik et al.

(10) Patent No.: US 9,754,004 B2
(45) Date of Patent: Sep. 5, 2017

(54) ASYNCHRONOUS NOTIFICATION METHOD FOR DATA STORAGE SYSTEMS

(71) Applicant: EMC Corporation, Hopkinton, MA (US)

(72) Inventors: Dmitry Nikolayevich Tylik, Saint Petersburg (RU); Sergey Alexandrovich Alexeev, St. Petersburg (RU); Alexey Vladimirovich Shusharin, Saint Petersburg (RU); Alexey Valeryevich Martynov, Saint-Petersburg (RU)

(73) Assignee: EMC Corporation, Hopkinton, MA (US)

(*) Notice: Subject to any disclaimer, the term of this patent is extended or adjusted under 35 U.S.C. 154(b) by 297 days.

(21) Appl. No.: 14/410,295

(22) PCT Filed: Dec. 23, 2013

(86) PCT No.: PCT/RU2013/001151
§ 371 (c)(1),
(2) Date: Dec. 22, 2014

(87) PCT Pub. No.: WO2015/099554
PCT Pub. Date: Jul. 2, 2015

(65) Prior Publication Data
US 2016/0275161 A1    Sep. 22, 2016

(51) Int. Cl.
G06F 17/30    (2006.01)
G06F 3/06     (2006.01)

(52) U.S. Cl.
CPC ...... *G06F 17/30578* (2013.01); *G06F 3/0619* (2013.01); *G06F 3/0665* (2013.01); *G06F 3/0689* (2013.01); *G06F 17/30345* (2013.01); *G06F 17/30368* (2013.01)

(58) Field of Classification Search
CPC ................................................. G06F 17/30368
See application file for complete search history.

(56) References Cited

U.S. PATENT DOCUMENTS

| | | | |
|---|---|---|---|
| 5,499,367 A | 3/1996 | Bamford et al. | |
| 7,484,055 B1 | 1/2009 | Gupta et al. | |
| 2006/0171330 A1 | 8/2006 | Mandrell et al. | |
| 2010/0071572 A1* | 3/2010 | Carroll ................. | B30B 9/3042 100/229 A |

* cited by examiner

*Primary Examiner* — Grace Park
(74) *Attorney, Agent, or Firm* — BainwoodHuang

(57) ABSTRACT

An improved technique involves delivering asynchronous notifications of state changes of components of a data storage system by querying a database whose entries contain event descriptors along with a sequentially generated identifier value. In response to a state change of a component, a database server receives a state change indication and updates an entry in the database by recording the state change and generating a new identifier value. A management server running management software then detects state changes by noting the largest generated identifier value from a previous query and queries all entries in the database having an identifier value larger than that previous value. The layers of the management software that subscribe to state change indications of various components may then access those entries as needed.

14 Claims, 6 Drawing Sheets

ASYNCHRONOUS NOTIFICATION METHOD FOR DATA STORAGE SYSTEMS

BACKGROUND

Data storage systems contain components that may take on various state values at any given instant in time. For example, a data storage system contains a disk within a RAID array that may be online or offline. The reason for the disk being offline may be due to failure or disconnection.

Because data storage systems typically contain many such components, tracking the state of the components may benefit from the assistance of management software such as EMC® Unisphere™. Such management software provides communication between the drivers of the components of the data storage system and a graphical user interface (GUI) of the management software that displays the states of the components to a storage administrator. For example, suppose that the state of a disk within the RAID array changes from being online to being offline. The driver for the disk would then send a notification to a computer running the management software in response to the change so that the disk administrator may learn about the state change.

Management software typically contains several layers as a result of its architecture. The computer running the management software passes messages such as a state change indications from the component drivers to the Unisphere GUI up through various software layers.

In order to ensure that a large number of simultaneous state change indications are handled properly, conventional state change indication systems deliver asynchronous notifications of state changes of components of a data storage system by queuing indications of notifications in RAM for delivery through the various layers of storage management software. In this way, the computer may pass the notifications to the GUI in a desired order.

SUMMARY

Unfortunately, there are deficiencies with the above-described conventional state change indication systems in data storage systems. For example, the delivery of indications to the end user of the management software (i.e., the GUI layer) is not guaranteed upon restart because the computer running the management software does not store the notifications persistently. Rather, as described above, the computer queues the notifications in RAM. If the computer undergoes a reboot while there are notifications in the queue, then those notifications will be lost.

Also, a failure of a single physical disk may create multiple notifications which would need to be propagated through the various software layers, thus requiring many CPU cycles. This is because multiple software layers subscribe to change indications from the same component.

In contrast with the above-described conventional state change indication systems in data storage systems which are inefficient and subject to losing notifications upon a restart, an improved technique involves delivering asynchronous notifications of state changes of components of a data storage system by querying a database whose entries contain event descriptors along with a sequentially generated identifier value. In response to a state change of a component, a database server receives a state change indication and updates an entry in the database by recording the state change and generating a new identifier value. A management server running management software then detects state changes by noting the largest generated identifier value from a previous query and queries all entries in the database having an identifier value larger than that previous value. The layers of the management software that subscribe to state change indications of various components may then access those entries as needed.

Advantageously, the improved technique guarantees delivery of notifications to end users upon a restart of the management server because the notifications are queued in persistent storage. Further, because the software layers may directly access, in the database, notifications to which they subscribe, the management server requires fewer CPU cycles to propagate notifications to the GUI.

One embodiment of the improved technique is directed to a method of maintaining state information of components of the data storage system. The method includes receiving indications of state changes of components of the data storage system, each indication including a value of a component change identifier that identifies a component of the data storage system undergoing a change of state. The method also includes persistently storing, by a database server that hosts a management database, the values of the component change identifiers of the indications into respective entries of the management database in response to the receipt of the indications. The method further includes, for each of the entries of the management database into which the values of the component change identifiers of the indications were persistently stored, generating, by the database server, a value of the generation identifier field of that entry, each value of the generation identifier field being generated sequentially to indicate an order in time at which that indication was received by the database server.

Additionally, some embodiments of the improved technique are directed to an apparatus constructed and arranged to maintain state information of components of the data storage system. The apparatus includes memory and a set of processors coupled to the memory to form controlling circuitry. The controlling circuitry is constructed and arranged to carry out a method of maintaining state information of components of the data storage system.

Furthermore, some embodiments of the improved technique are directed to a computer program product having a non-transitory computer-readable storage medium which stores code including a set of instructions which, when executed by a data storage system, cause the data storage system to maintain state information of components of the data storage system.

In some arrangements, each entry further includes a value of a component identifier field that identifies a component of the data storage system and a value of a change of state field that indicates whether there has been a change of state of the component. Persistently storing the indications into the entries of the management database includes, for each indication locating an entry having a value of the component identifier field that is the component undergoing the change of state identified by the value of the component change identifier of that indication, and updating the value of the change of state field of the located entry according to the value of the component change identifier of that indication.

In some arrangements, the method further includes receiving, from a management server, a database query, the database query including a value of a query key, the query key being indicative of a constraint with respect to values of the generation identifier field of the entries of the management database, and after receipt of the database query, transmitting, to the management server, i) the values of the change of state field of the entries of the management database having values of the generation identifier field that satisfy the constraint indicated by the query key, and ii) the values of the generation identifier field of those entries of the management database.

In some arrangements, the management server includes an indication manager configured to query the management database in response to receiving an indication that there is a change of state in at least one component of the data storage system. The method further includes sending a notification to the indication manager upon receipt of the indications. Receiving the database query includes obtaining a database query command from the indication manager after sending the notification.

In some arrangements, the values of the generation identifier field of the entries of the management database include integer counters. Generating the value of the generation identifier field for each of the entries of the management database into which the values of the component change identifiers of the indications were persistently stored includes incrementing an integer counter of the value of the generation identifier field of that entry after persistently storing that value of the generation identifier field in that entry.

In some arrangements, the query key includes the integer counter of the token generation identifier value of a previous entry of the management database, the previous entry having a value of the change of state field that had been transmitted to the management server prior to the notifications being stored by the database server. Transmitting the value of the change of state field of the entries of the management database having values of the generation identifier field that satisfy the constraint indicated by the query key includes identifying entries of the management database having the integer counter of values of the generation identifier field being larger than the token generation identifier value, and sending the values of the component descriptor field of the identified entries of the management database.

In some arrangements, the management server further includes software layers of a multilayered software architecture arranged in a hierarchy, each of the software layers being configured to subscribe to state change information from respective components of the data storage system. Transmitting the value of the change of state field of the entries of the management database having values of the generation identifier field that satisfy the constraint indicated by the query key includes, for each entry of the management database having values of the generation identifier field that satisfy the constraint indicated by the query key, sending the value of the change of state field of that entry to the software layers that subscribe to state change information from the value of the change of state field of that entry.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves delivering asynchronous notifications of state changes of components of a data storage system by querying a database whose entries contain event descriptors along with a sequentially generated identifier value. In response to a state change of a component, a database server receives a state change indication and updates an entry in the database by recording the state change and generating a new identifier value. A management server running management software then detects state changes by noting the largest generated identifier value from a previous query and queries all entries in the database having an identifier value larger than that previous value. The layers of the management software that subscribe to state change indications of various components may then access those entries as needed.

Figure 1:
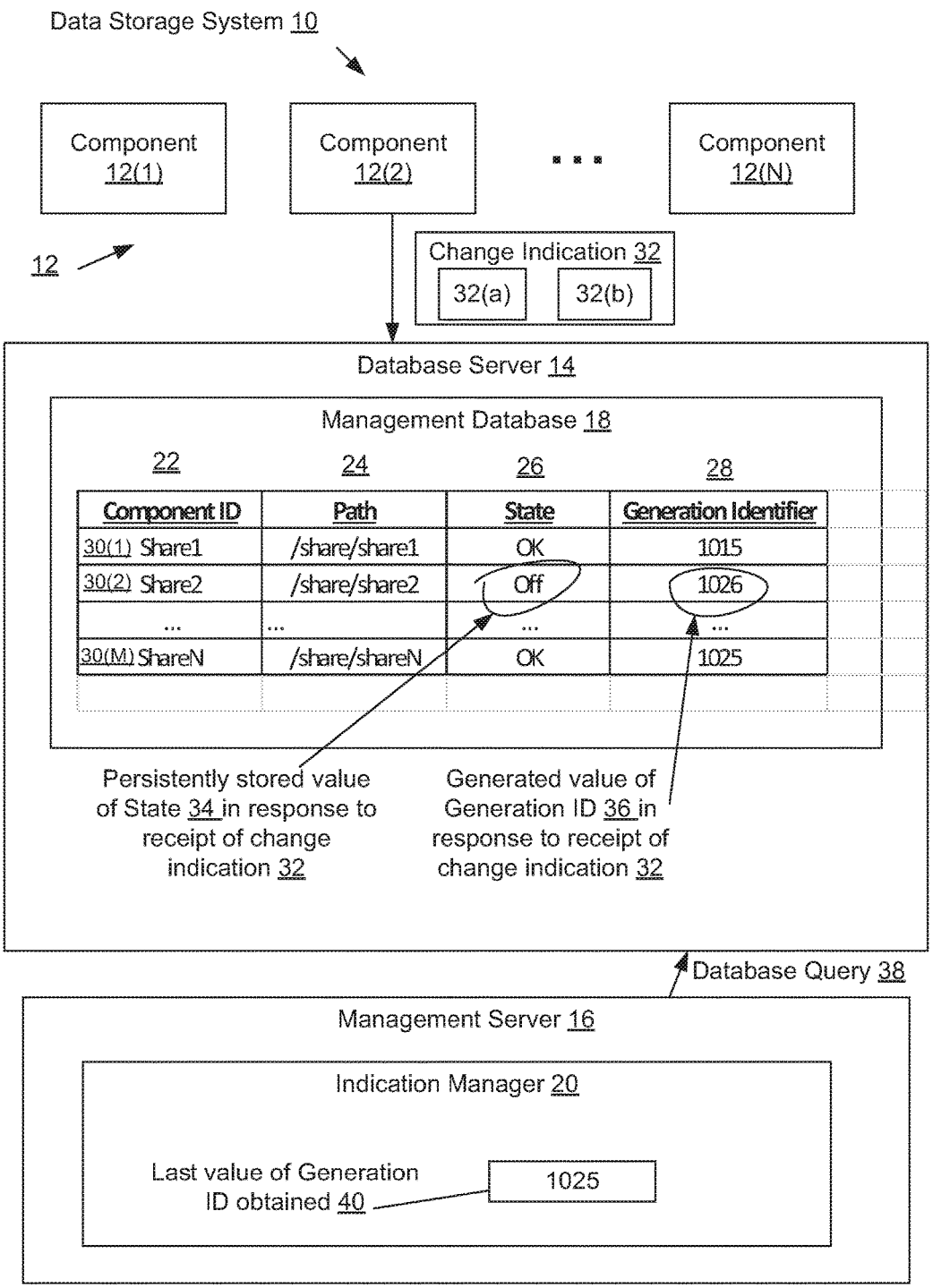
FIG. 1 is a block diagram illustrating an example data storage system in which the improved technique may be carried out.

FIG. 1 illustrates an example data storage system 10 in which the improved techniques are carried out. Data storage system 10 includes system components 12(1), 12(2), . . . , 12(N) (collectively, components 12), where N is the number of components of the data storage system that are being monitored. Data storage system 10 also includes database server 14 and management server 16.

Each system component 12 is an individual device or software system that acts in concert to make data storage system 10 function as required. Examples of system components 12 include disks, RAID arrays, storage processors, software run by storage processors, backplane connectors, and the like. Each component 12 is configured to send a change indication 32 to database server 14 upon experiencing a change of state. For example, a change of state of a RAID array may be indicative of whether its fourth disk is active or offline. Note that the state of the RAID array and the state of individual disks within the array are linked; thus, a notification of a change of state of the fourth disk may also imply a change of state of the RAID array.

It should be understood that a state of a component is a set of values of parameters that describe the component. For example, a disk within an array may be described as active or offline, repaired or broken, utilized or idle, and so on.

Change indication 32 includes field 32a whose value identifies the component from which change indication 32 was created and sent, and field 32b whose value represents the new state of the component.

Database server 14 is a server or server cluster configured to receive change indications 32. Database server 14 is further configured to run management database 18 and receive key values from management server 16 that point to the most recent previous state change stored in management database 18.

Management database 18 is configured to store information about the state of components 12 in data storage system 10. Management database 18 includes a set of fields including, for example, a component ID 22, path 24, state 26, and generation identifier 28. Management database 18 also includes a set of entries 30(1), 30(2), . . . , 30(N).

The component ID field 22 has a value in each entry 30 representing a particular component 12 of data storage system 10. In this way, each entry 30 of management database 18 corresponds to a component 12.

The path identifier 24 field has a value in each entry 30 representing a location in data storage system 10 where information about the component identified in that entry (via the value of component ID 22) may be found.

The state field 26 has a value in each entry 30 representing a value of the state of the component identified in that entry. This value may take on any string or numerical value that describes the functioning of that component. For example, a disk may be "available" or "unavailable," while an array may have a reference to disks such as "124" that are offline, i.e., disks 1, 2, and 4. It should be understood that, as described above, the state of a component may be made up of values of multiple parameters. In the example illustrated in FIG. 1, only one such parameter is shown for simplicity.

The generation identifier field 28 is a number that represents the order in which a component's state was changed. Upon receiving change indication 32, database server 14 increments a previous value of the generation identifier field 28 and places the incremented value in the field in the entry corresponding to the component.

Management server 16 is a server, although in some arrangements, management server 16 is a desktop computer, laptop computer, or any computing device capable of running management software, e.g., a storage processor of data storage system 10. Management server 16 includes indication manager 20 which is configured to track which change indications have been distributed to software layers of the management software. (Further details concerning the software layers will be discussed below in connection with FIG. 4.) Management server 16 is configured to communicate component state changes among the software layers and ultimately to a data storage system administrator.

Indication manager 20 is a software process that stores in memory the value of the generation identifier 28 used in the most recent query of management database 18. When management server 16 is notified of a new state change, indication manager 20 causes management server 16 to send this value of the generation identifier 28 to database server 14 as part of a database query. It should be understood that a benefit of persisting the value of the generation identifier 28 used in the most recent query of management database 18 is that one may understand, upon a reboot, which of the indications were processed and which were not.

During operation, when a component, say 12(2), of data storage system 10 experiences a change of state (due to, e.g., a hardware failure, allocation request, etc.), component 12(2) generates change indication 32 which identifies component 12(2) and the change of state it is undergoing. Component 12(2) then sends change indication 32 to database server 14 over, e.g., a fiber channel connection.

Database server 14 receives change indication 32 and reads the values of the fields 32a and 32b. Database server 14 then performs a lookup to find the entry, say 30(2), of management database 18 with its value of component ID field 22 equal to the value of field 32a.

Upon finding entry 30(2), database server 14 updates the value of state field 26 according to field value 32b in change indication 32 to a new value 34. In some arrangements, the value of state field 26 is binary, so that the receipt of change indication 32 is merely a toggle command to cause database server 14 to flip the binary value of state field 26 to the other possible value. In other arrangements, such receipt may cause database server 14 to replace the current value of a parameter of state field 26 to a new value.

Upon updating the value of state field 26, database server 14 increments the value of generation ID field 28 from a previous value stored in memory to a new value 36. In the example illustrated in FIG. 1, the previous largest value of generation ID field 28 is "1025", so that database server replaces the value of generation ID 28 in entry 30(2) with the value "1026".

Sometime later, management server 16 sends a database query 38 to management server to locate components that have undergone a state change. In some arrangements, database server 14 may have sent a notification to management server 16 that it has received change indications. In other arrangements, management server 16 may periodically send database queries 38 to database server 14 according to a schedule.

It should be understood that such database queries 38 include a key value in the form of the last value 40 of Generation ID field 28 it has obtained in the most recent database query. Using this key value, management server 16 is able to obtain all of the state changes stored in database 18 that have occurred since the previous database query. Further, because the state changes are persisted in storage in database 18, the changes will not be lost even if both management server 16 and database server 14 need to be restarted.

Further details concerning database server 14 and management server 16 are discussed below in connection with FIGS. 2 and 3, respectively.

Figure 2:
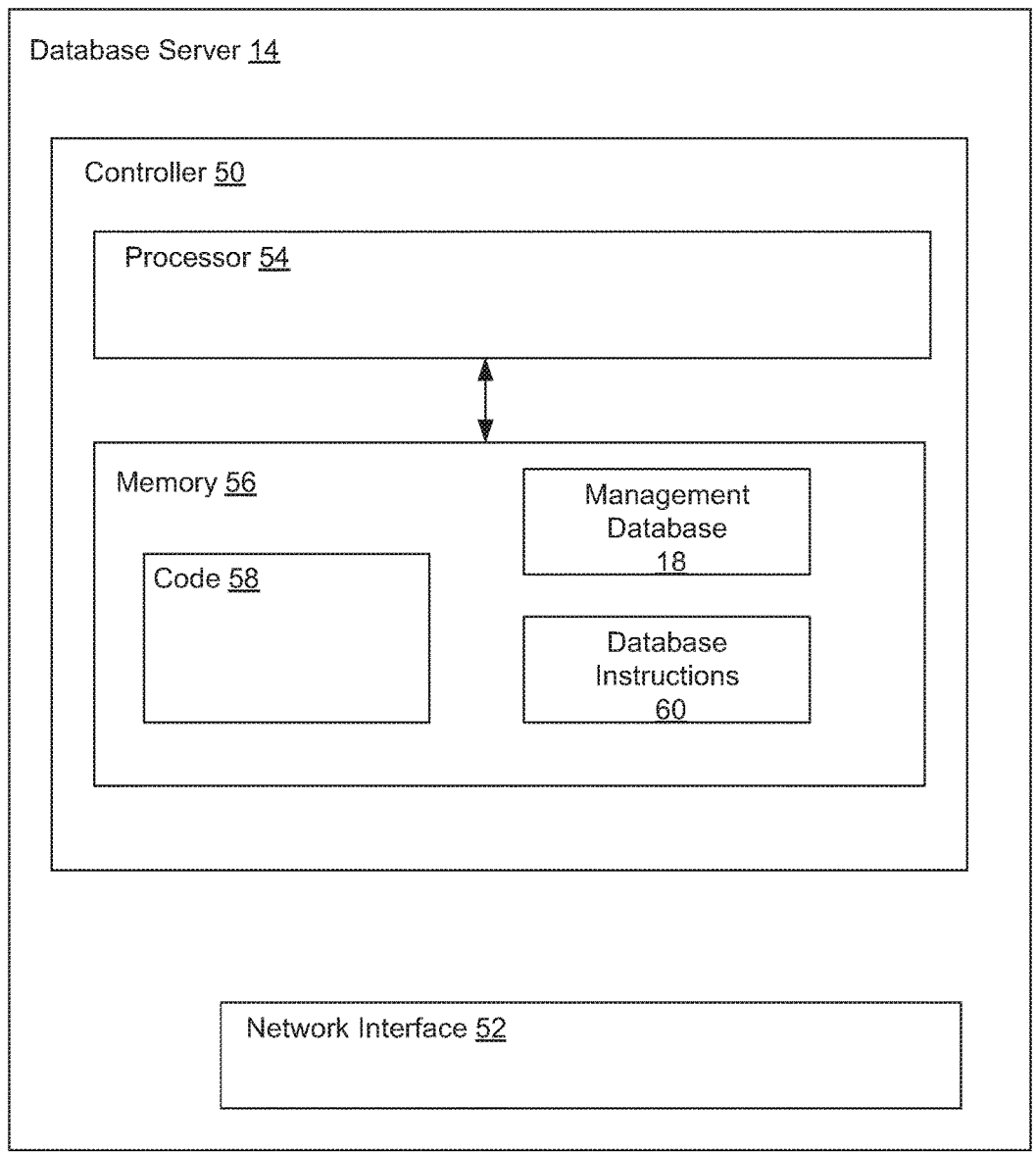
FIG. 2 is block diagram illustrating an example database server within the data storage system shown in FIG. 1.

FIG. 2 illustrates database server 14. Database server 14 includes controller 50, which in turn includes processor 54 and memory 56; and network interface 52.

Network interface 52 takes the form of an Ethernet card; in some arrangements, network interface 52 takes other forms including a wireless receiver and a token ring card. In other arrangements, network interface 42 includes an interface for fiber channel or backplane communications.

Memory 56 stores code 58 that contains instructions to maintain state information of components 12 of data storage system 10. Memory 56 generally takes the form of, e.g., random access memory, although in some arrangements memory 56 includes flash memory or a non-volatile memory. Memory 56 contains management database 18 and database instructions 60 for operating management database 18.

Processor 54 takes the form of, but is not limited to, Intel or AMD-based MPUs, and can include a single or multiple cores each running single or multiple threads. Processor 54 is coupled to memory 56 and is configured to execute instructions from database instructions 60.

Figure 3:
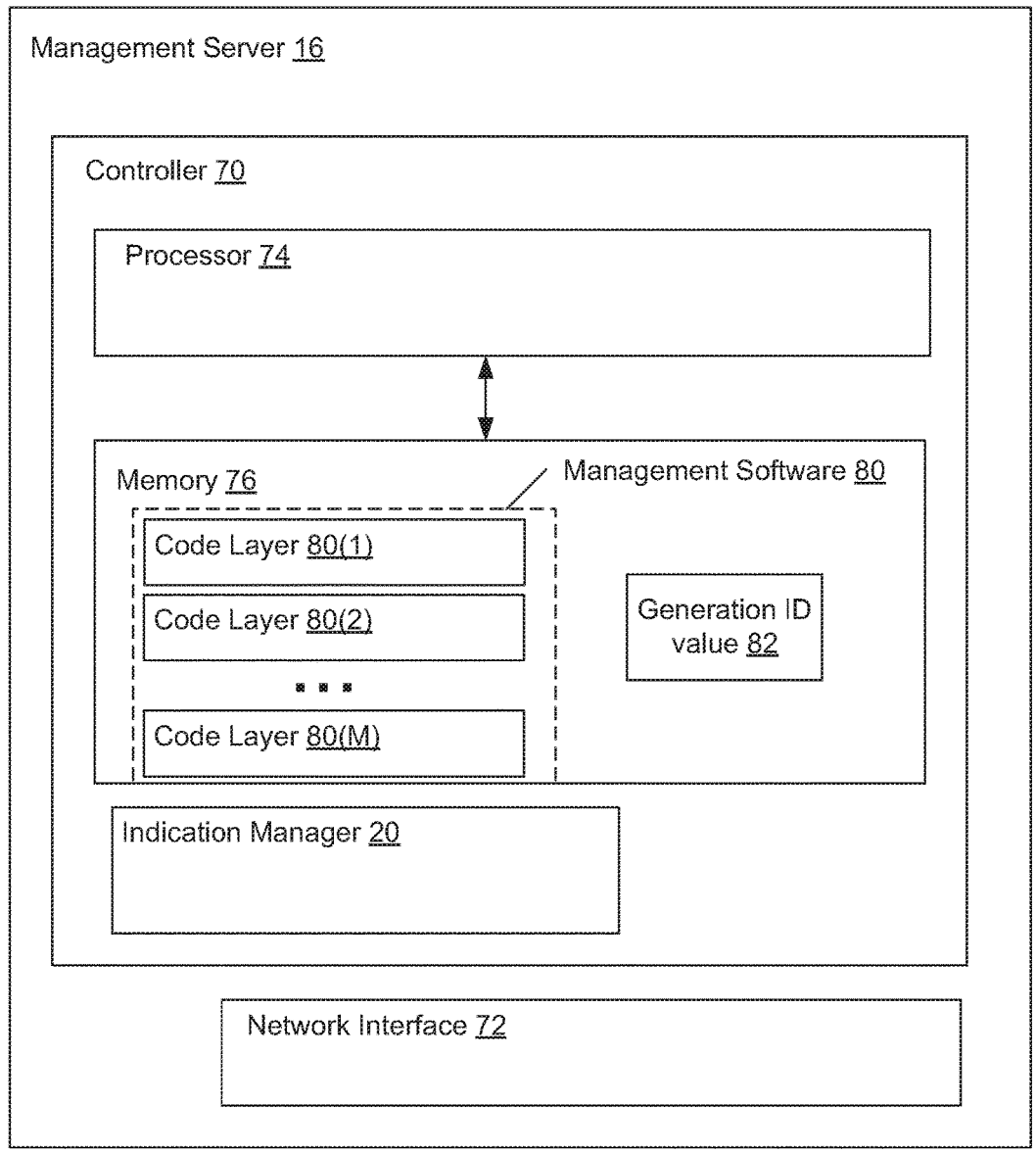
FIG. 3 is block diagram illustrating an example management server within the data storage system shown in FIG. 1.

FIG. 3 illustrates management server 16. Management server 16 includes controller 70, which in turn includes processor 74 and memory 76; and network interface 72.

Network interface 72 takes the form of an Ethernet card; in some arrangements, network interface 72 takes other forms including a wireless receiver and a token ring card. In other arrangements, network interface 72 includes an interface for fiber channel or backplane communications.

Memory 76 is configured to store code layers 80(1), 80(2), . . . , 80(M), where M is the number of software layers that make up management software 80. Memory 76 generally takes the form of, e.g., random access memory, although in some arrangements memory 76 includes flash memory or a non-volatile memory. Memory 76 also contains a previous generation ID value 82 which management server 16 includes in a database query. Memory 76 further includes indication manager 20 which, as discussed above, generates database queries using generation ID value 82 and sends such queries to database server 14.

Code layers 80(1), 80(2), . . . , 80(M) of management software 80 represent various architectural layers that are arranged in a hierarchy and communicate with one another. On the bottom, say 80(M), lies the layer that interfaces with drivers of components 12. On the top, say 80(1), lies the layer that provide an interface to the storage administrator. In between are various services performing management functions. Further details about these layers are discussed below in connection with FIG. 4.

Processor 74 takes the form of, but is not limited to, Intel or AMD-based MPUs, and can include a single or multi-cores each running single or multiple threads. Processor 74 is coupled to memory 76 and is configured to execute instructions from code layers 80(1), 80(2), . . . , 80(M).

Figure 4:
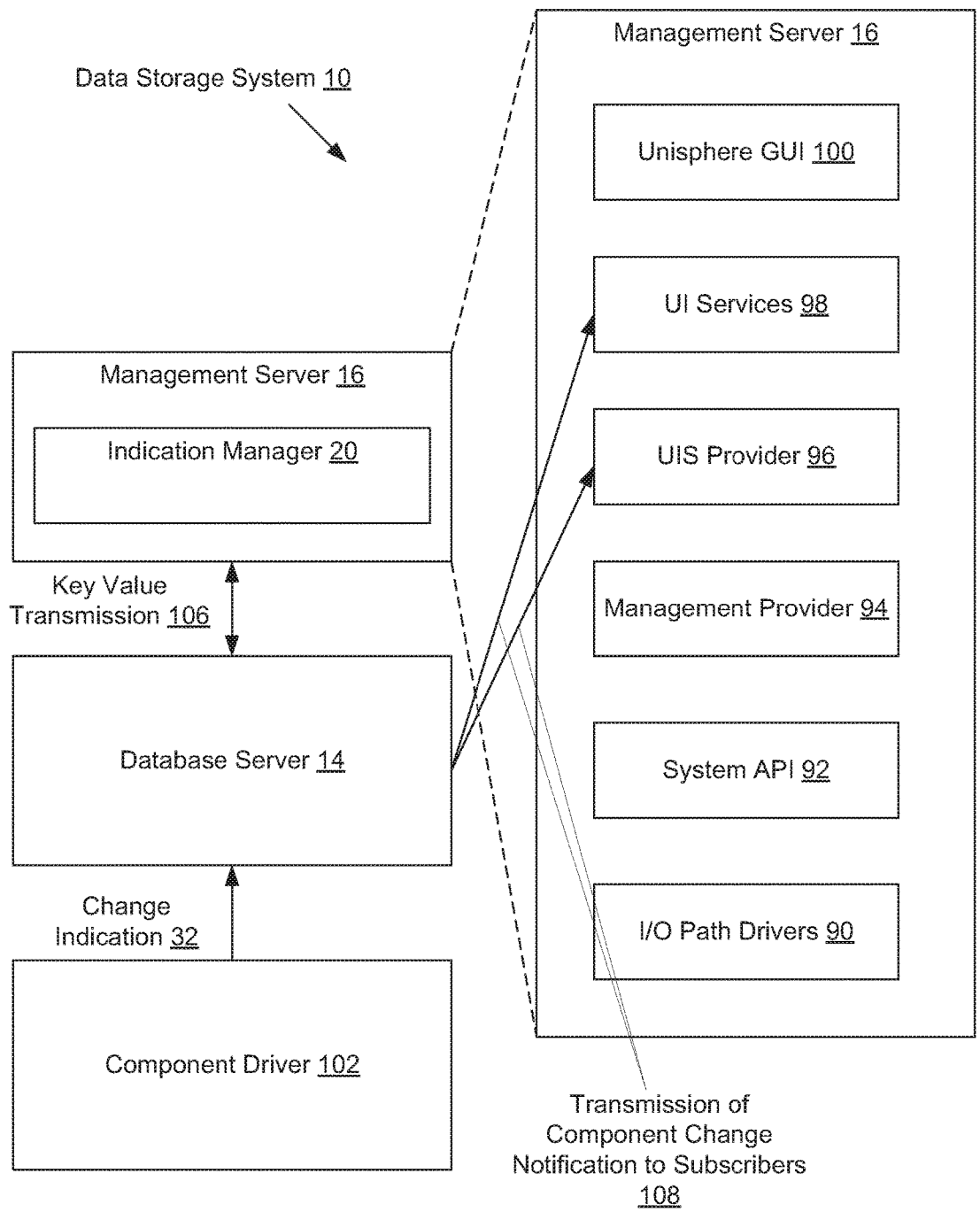
FIG. 4 is a block diagram illustrating another perspective of the example data storage system shown in FIG. 1.

FIG. 4 illustrates another point of view of data storage system 10, which includes component driver 102, database server 14, and management server 16.

Component driver 102 is configured to generate change indication 32 in response to detecting a change in the component that it drives, and send change indication 32 to database server 14 upon generation.

Upon receiving change indication 32, database server 14 updates database 18 (see FIG. 1). Either in response to a notification of this update, or as a result of a periodic query, indication manager 20 of management server 16 transmits the query including a key value to database server 14. From this key value, database server 14 is able to identify the entries 30 in database 18 from which database server 14 will send state change indications 108 to management server 16.

In some arrangement, in sending notifications 108 to management server 16, database server 14 identifies software layers, e.g., I/O path drivers 90, system API 92, management provider 94, UIS provider 96, UI services 98, Unisphere GUI 100, that subscribe to change indications for various components 30. For example, UIS provider 96 may subscribe to change indications for a disk, while UI services 98 may subscribe to change indications for an array containing the disk. If there is a change indication for that disk, then database server 14 sends the change indications corresponding to that disk, with generation IDs greater than that indicated by the key value 106, to both UIS provider 96 and UI services 98.

An advantage of having database server 14 send notifications to subscribers in this manner is that the MPU cycles needed to propagate changes up from the bottom layer to the correct layers are eliminated.

Figure 5:
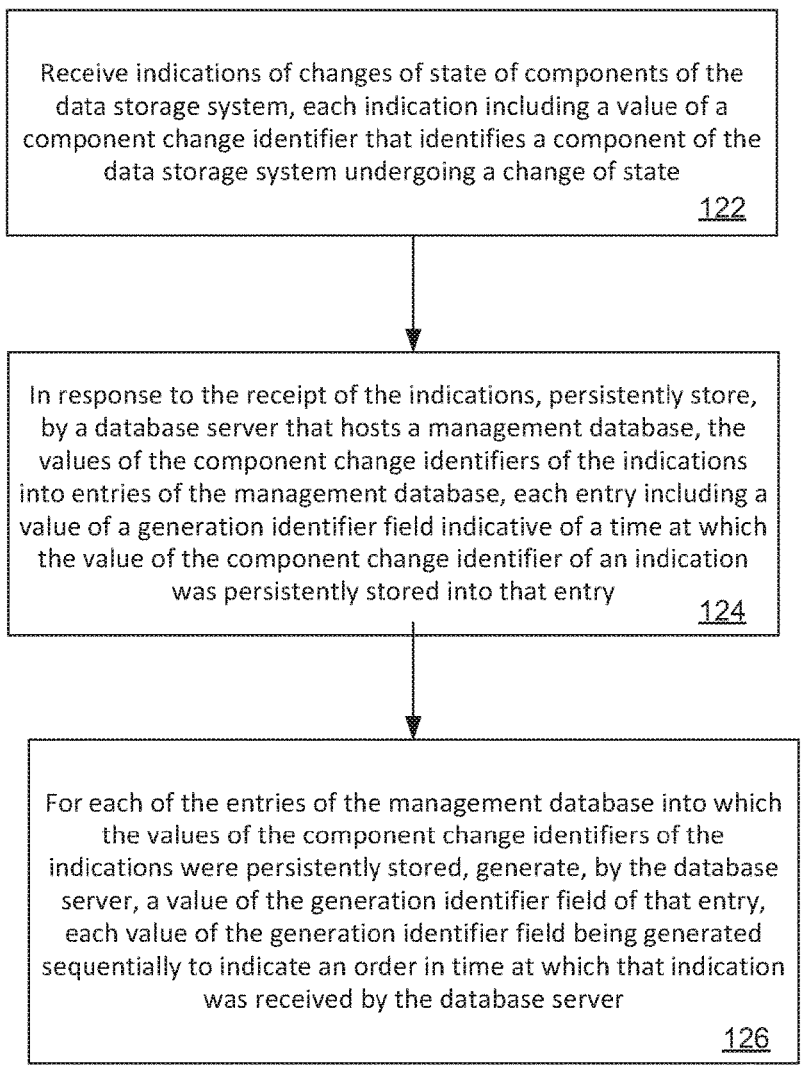
FIG. 5 is a flow chart illustrating an example method of carrying out the improved technique within the data storage system shown in FIG. 1.

FIG. 5 illustrates a method 120 of maintaining state information of components of the data storage system, including steps 122, 124, and 126. In step 122, a computer such as database server 14 receives indications, e.g., indication 32 of state changes of components, e.g., components 12 of a data storage system, e.g., data storage system 10, each indication including a value of a component change identifier, e.g., field value 32a that identifies a component of the data storage system undergoing a change of state. In step 124, in response to the receipt of the indications, the database server persistently stores the values of the component change identifiers of the indications into respective entries, e.g., entries 30 of a management database, e.g., database 18. In step 126, for each of the entries of the management database into which the values of the component change identifiers of the indications were persistently stored, the database server generates a value of the generation identifier field, e.g., field 28 of that entry, each value of the generation identifier field being generated sequentially to indicate an order in time at which that indication was received by the database server.

Figure 6:
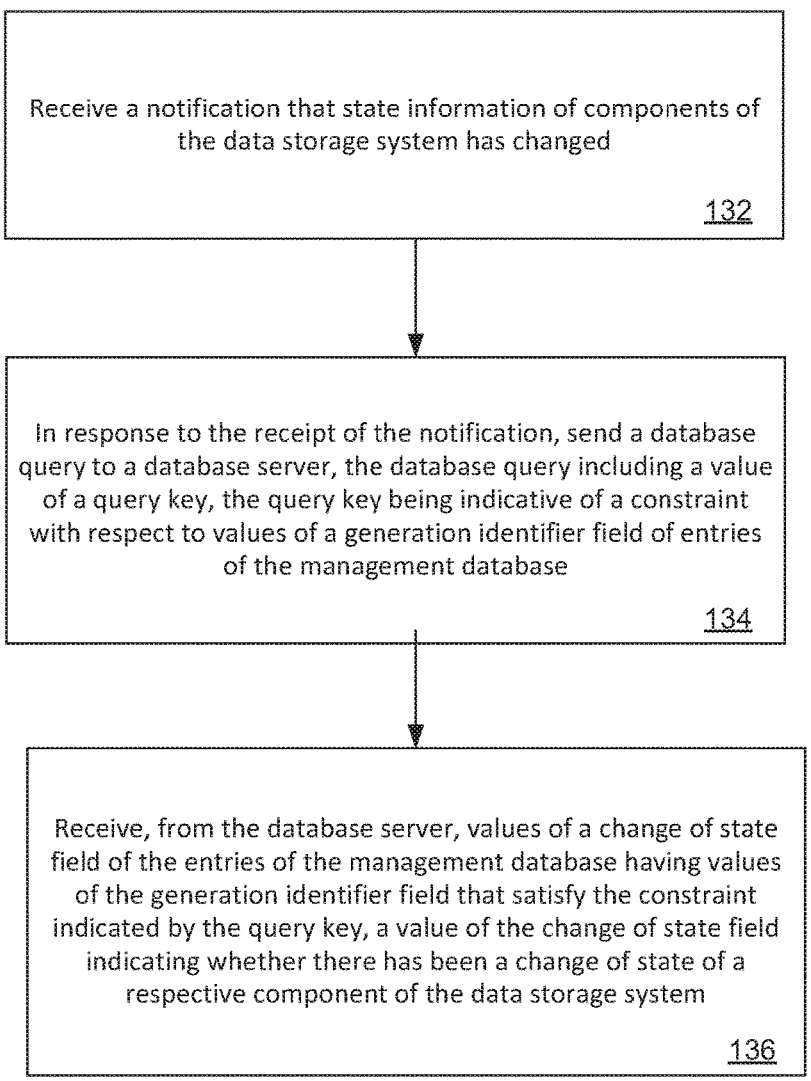
FIG. 6 is a flow chart illustrating another example method of carrying out the improved technique within the data storage system shown in FIG. 1.

FIG. 6 illustrates a method 130 of retrieving state information of components of the data storage system, including steps 132, 134, and 136. In step 132, a management server, e.g., management server 16, receives a notification that state information of components of the data storage system has changed. In step 134, in response to receiving the notification, the management server sends a database query to a database server, e.g., database server 14, the database query including a value of a query key, the query key being indicative of a constraint with respect to values of a generation identifier field of entries of the management database. In step 136, the management server receives, from the database server, values of a change of state field of the entries of the management database having values of the generation identifier field that satisfy the constraint indicated by the query key, a value of the change of state field indicating whether there has been a change of state of a respective component of the data storage system.

As used throughout this document, the words "comprising," "including," and "having" are intended to set forth certain items, steps, elements, or aspects of something in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion has dealt mainly with management databases that send change indications to management servers upon receiving indications In some arrangements, however, the management databases may simply send queries periodically.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. In a data storage system, a method of maintaining state information of components of the data storage system, the method comprising:

receiving indications of state changes of components of the data storage system, each indication including a value of a component change identifier that identifies a component of the data storage system undergoing a change of state;

in response to the receipt of the indications, persistently storing, by a database server that hosts a management database, the values of the component change identifiers of the indications into respective entries of the management database, each entry including a value of a component identifier field that identifies a component of the data storage system and a value of a change of state field that indicates whether there has been a change of state of the component, wherein persistently storing includes, for each indication:
  locating an entry having a value of the component identifier field that is the component undergoing the change of state identified by the value of the component change identifier of that indication, and
  updating the value of the change of state field of the located entry according to the value of the component change identifier of that indication;
for each of the entries of the management database into which the values of the component change identifiers of the indications were persistently stored, generating, by the database server, a value of the generation identifier field of that entry, each value of the generation identifier field being generated sequentially to indicate an order in time at which that indication was received by the database server;
receiving, from a management server, a database query, the database query including a value of a query key, the query key being indicative of a constraint with respect to values of the generation identifier field of the entries of the management database; and
after receipt of the database query, transmitting, to the management server, i) the values of the change of state field of the entries of the management database having values of the generation identifier field that satisfy the constraint indicated by the query key, and ii) the values of the generation identifier field of those entries of the management database.

2. A method as in claim 1,
wherein the management server includes an indication manager configured to query the management database in response to receiving an indication that there is a change of state in at least one component of the data storage system;
wherein the method further comprises:
  sending a notification to the indication manager upon receipt of the indications; and
wherein receiving the database query includes:
  obtaining a database query command from the indication manager after sending the notification.

3. A method as in claim 2,
wherein the values of the generation identifier field of the entries of the management database include integer counters;
wherein generating the value of the generation identifier field for each of the entries of the management database into which the values of the component change identifiers of the indications were persistently stored includes:
  incrementing an integer counter of the value of the generation identifier field of that entry after persistently storing that value of the generation identifier field in that entry.

4. A method as in claim 3,
wherein the query key includes the integer counter of the token generation identifier value of a previous entry of the management database, the previous entry having a value of the change of state field that had been transmitted to the management server prior to the notifications being stored by the database server; and
wherein transmitting the value of the change of state field of the entries of the management database having values of the generation identifier field that satisfy the constraint indicated by the query key includes:
  identifying entries of the management database having the integer counter of values of the generation identifier field being larger than the token generation identifier value; and
  sending the values of the component descriptor field of the identified entries of the management database.

5. A method as in claim 1,
wherein the management server further includes software layers of a multilayered software architecture arranged in a hierarchy, each of the software layers being configured to subscribe to state change information from respective components of the data storage system; and
wherein transmitting the value of the change of state field of the entries of the management database having values of the generation identifier field that satisfy the constraint indicated by the query key includes:
  for each entry of the management database having values of the generation identifier field that satisfy the constraint indicated by the query key, sending the value of the change of state field of that entry to the software layers that subscribe to state change information from the value of the change of state field of that entry.

6. In a data storage system, a method of retrieving state information of components of the data storage system, the method comprising:
  receiving a notification that state information of components of the data storage system has changed;
  in response to receiving the notification, sending a database query to a database server, the database query including a value of a query key, the query key being indicative of a constraint with respect to values of a generation identifier field of entries of the management database; and
  receiving, from the database server, values of a change of state field of the entries of the management database having values of the generation identifier field that satisfy the constraint indicated by the query key, a value of the change of state field indicating whether there has been a change of state of a respective component of the data storage system.

7. A data storage system constructed and arranged to maintain state information of components of the data storage system, the data storage system comprising:
  a management server constructed and arranged to manage the data storage system; and
  a database server constructed and arranged to host a management database, the database server including:
    a network interface;
    memory; and
    a controller including controlling circuitry coupled to the memory, the controlling circuitry being constructed and arranged to:
      receive indications of state changes of components of the data storage system, each indication including a value of a component change identifier that identifies a component of the data storage system undergoing a change of state;
      in response to the receipt of the indications, persistently store the values of the component change identifiers of the indications into respective entries of the management database, each entry including a value of a component identifier field that identifies a component of the data storage system and a value of a change of state field that indicates whether there has been a change of state of the component, wherein persistently storing includes, for each indication:
   locating an entry having a value of the component identifier field that is the component undergoing the change of state identified by the value of the component change identifier of that indication, and
   updating the value of the change of state field of the located entry according to the value of the component change identifier of that indication;
for each of the entries of the management database into which the values of the component change identifiers of the indications were persistently stored, generate a value of the generation identifier field of that entry, each value of the generation identifier field being generated sequentially to indicate an order in time at which that indication was received by the database server;
receive, from the management server, a database query, the database query including a value of a query key, the query key being indicative of a constraint with respect to values of the generation identifier field of the entries of the management database; and
after receipt of the database query, transmit, to the management server, i) the values of the change of state field of the entries of the management database having values of the generation identifier field that satisfy the constraint indicated by the query key, and ii) the values of the generation identifier field of those entries of the management database.

8. A data storage system as in claim 7,
wherein the management server includes an indication manager configured to query the management database in response to receiving an indication that there is a change of state in at least one component of the data storage system;
wherein the controlling circuitry is further constructed and arranged to:
   send a notification to the indication manager upon receipt of the indications; and
wherein the controlling circuitry constructed and arranged to receive the database query is further constructed and arranged to:
   obtain a database query command from the indication manager after sending the notification.

9. A data storage system as in claim 8,
wherein the values of the generation identifier field of the entries of the management database include integer counters;
wherein the controlling circuitry constructed and arranged to generate the value of the generation identifier field for each of the entries of the management database into which the values of the component change identifiers of the indications were persistently stored is further constructed and arranged to:
   increment an integer counter of the value of the generation identifier field of that entry after persistently storing that value of the generation identifier field in that entry.

10. A data storage system as in claim 9,
wherein the query key includes the integer counter of the token generation identifier value of a previous entry of the management database, the previous entry having a value of the change of state field that had been transmitted to the management server prior to the notifications being stored by the database server; and
wherein the controlling circuitry constructed and arranged to transmit the value of the change of state field of the entries of the management database having values of the generation identifier field that satisfy the constraint indicated by the query key is further constructed and arranged to:
   identify entries of the management database having the integer counter of values of the generation identifier field being larger than the token generation identifier value; and
   send the values of the component descriptor field of the identified entries of the management database.

11. A data storage system as in claim 7,
wherein the management server further includes software layers of a multilayered software architecture arranged in a hierarchy, each of the software layers being configured to subscribe to state change information from respective components of the data storage system; and
wherein the controlling circuitry constructed and arranged to transmit the value of the change of state field of the entries of the management database having values of the generation identifier field that satisfy the constraint indicated by the query key is further constructed and arranged to:
   for each entry of the management database having values of the generation identifier field that satisfy the constraint indicated by the query key, send the value of the change of state field of that entry to the software layers that subscribe to state change information from the value of the change of state field of that entry.

12. A computer program product comprising a non-transitory, computer-readable storage medium which stores instructions that, when executed by a controller, cause the controller to maintain state information of components of a data storage system by:
receiving indications of state changes of components of the data storage system, each indication including a value of a component change identifier that identifies a component of the data storage system undergoing a change of state;
in response to the receipt of the indications, persistently storing, by a database server that hosts a management database, the values of the component change identifiers of the indications into respective entries of the management database, each entry including a value of a generation identifier field indicative of a time at which the value of the component change identifier of an indication was persistently stored into that entry, each entry including a value of a component identifier field that identifies a component of the data storage system and a value of a change of state field that indicates whether there has been a change of state of the component, wherein persistently storing includes, for each indication:
   locating an entry having a value of the component identifier field that is the component undergoing the change of state identified by the value of the component change identifier of that indication, and updating the value of the change of state field of the located entry according to the value of the component change identifier of that indication;

for each of the entries of the management database into which the values of the component change identifiers of the indications were persistently stored, generating, by the database server, a value of the generation identifier field of that entry, each value of the generation identifier field being generated sequentially to indicate an order in time at which that indication was received by the database server;

receiving, from a management server, a database query, the database query including a value of a query key, the query key being indicative of a constraint with respect to values of the generation identifier field of the entries of the management database; and after receipt of the database query, transmitting, to the management server, i) the values of the change of state field of the entries of the management database having values of the generation identifier field that satisfy the constraint indicated by the query key, and ii) the values of the generation identifier field of those entries of the management database.

13. A computer program product as in claim 12, wherein the management server includes an indication manager configured to query the management database in response to receiving an indication that there is a change of state in at least one component of the data storage system;

wherein the instructions further cause the controller to maintain state information of components of the data storage system by:

sending a notification to the indication manager upon receipt of the indications; and wherein receiving the database query includes:

obtaining a database query command from the indication manager after sending the notification.

14. A computer program product as in claim 13, wherein the values of the generation identifier field of the entries of the management database include integer counters;

wherein generating the value of the generation identifier field for each of the entries of the management database into which the values of the component change identifiers of the indications were persistently stored includes:

incrementing an integer counter of the value of the generation identifier field of that entry after persistently storing that value of the generation identifier field in that entry.

* * * * *